Oct. 28, 1958 H. F. OLSON ET AL 2,858,375

WIDE RANGE DYNAMIC PHONOGRAPH PICKUP

Filed Oct. 11, 1955

INVENTORS.
Harry F. Olson
& John Preston

BY [signature]

ATTORNEY.

United States Patent Office 2,858,375

Patented Oct. 28, 1958

2,858,375

WIDE RANGE DYNAMIC PHONOGRAPH PICKUP

Harry F. Olson, Princeton, and John Preston, Metedeconk, N. J., assignors to Radio Corporation of America, a corporation of Delaware Application October 11, 1955, Serial No. 539,744

6 Claims. (Cl. 179—100.41)

This invention relates to vibration translating devices such as phonograph pickups and the like and more particularly to moving coil or electrodynamic type vibration translating devices which include a coil disposed for movement in a magnetic field.

In dynamic pickups, a stylus arm is mechanically attached to, and moves a movable coil through a magnetic field to generate voltages in the coil. Many systems have been devised for supporting and centering the coil in the magnetic field for movement by the stylus, most of which have been unsatisfactory in some respect. For example, most of the proposed structures are of relatively high cost due to the complex nature of the system or to the difficulty of manufacture. Also in most pickups presently being marketed, some type of a rubber mounting is generally used, either to form the centering suspension in the magnetic air gap, or for damping purposes. Since the characteristics of rubber change with age, the characteristics of pickups of this type tend to vary considerably.

Accordingly, it is an object of this invention to provide an improved moving coil or dynamic pickup of simple and rugged construction which is highly efficient in use and has a vibrating system of very small mass.

It is a further object of this invention to provide an improved dynamic type phonograph transducer, having a simplified suspension system which enables easy and accurate centering of the movable coil in the magnetic gap, and does not require additional viscous damping means to eliminate resonant peaks.

In any flexible system the forward motion of a phonograph record with respect to the stylus has a tendency to pull the stylus arm and attached coil forward, resulting in a type of high frequency distortion. Furthermore, when the stylus is in contact with a phonograph record, the pressure on the stylus tends to displace the coil in the magnetic gap.

Accordingly, it is a further object of this invention to provide an improved and simplified suspension system for the movable elements of a dynamic pickup which stiffens the vibrating system against movement in undesired directions without deleteriously affecting the frequency response of the pickup.

In accordance with the invention, the coil assembly and stylus arm of the pickup are supported by a thin strip of resilient material which comprises the sole support for the vibrating elements of the pickup. A pair of magnetic pole pieces for the pickup are positioned in spaced relation to provide a magnetic air gap. The resilient support is secured to the pole pieces and across the magnetic air gap so that the coil assembly is centered in the magnetic air gap. Vibration of the stylus arm causes the resilient support to flex thereby moving the coil through the magnetic field to generate a voltage in accordance with the vibration.

A feature of the invention is the provision of a stabilizing arm which may be formed as an integral portion of the resilient support. The stabilizing arm is fastened to the pickup body in a manner to stiffen the vibrating system against motion in certain directions. For example, the vibrating system is stiffened against movement in the direction of record motion and also against displacement due to the weight supported by the stylus arm when the stylus is in engagement with a phonograph record.

The novel features which are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

Figures 1, 2, 3, 4:
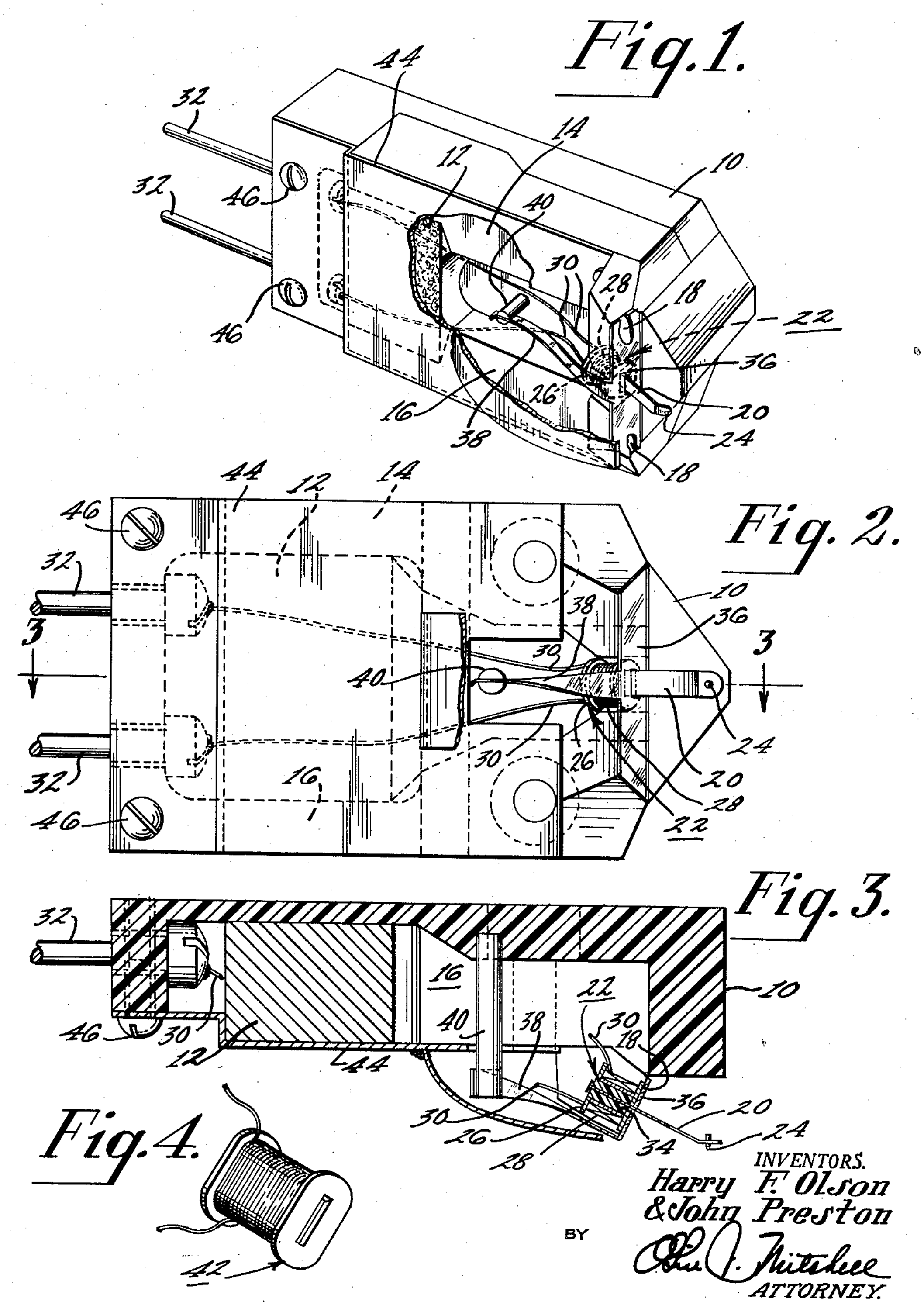
Figure 1 is a perspective view of a dynamic type phonograph pickup embodying the invention oriented to show the bottom side thereof and having a portion of the bottom cover broken away to illustrate certain constructional details.
Figure 2 is a slightly enlarged bottom plan view of the dynamic type phonograph pickup of Figure 1 having a portion of the bottom cover broken away.
Figure 3 is a sectional view of the pickup shown on Figure 2 taken on the section lines 3—3.
Figure 4 is an enlarged perspective view of an alternative construction of a movable coil for the dynamic type transducing device of the invention.

Referring now to the drawings wherein like reference numerals will be used to designate similar components throughout, the dynamic type phonograph pickup of the invention includes a base member 10 formed of any suitable material such as Bakelite. The base member 10 is adapted to receive and position a permanent magnet 12 which is preferably formed of a suitable aluminum-nickel cobalt alloy, and a pair of suitable ferromagnetic pole pieces 14 and 16. The permanent magnet 12 and the pole pieces 14 and 16 are cemented to the base member 10 to retain them in the proper position.

The pole pieces 14 and 16 are positioned in spaced relation along opposite sides of the base member 10, and have a portion near the forward end thereof, the right hand end as viewed in Figures 1–3, which projects inwardly to form a relatively narrow magnetic air gap positioned generally below the major portion of the pickup body. The configuration of the pole pieces 14 and 16 is such that the forward ends thereof present the surfaces 18 on either side of the magnetic air gap which face in a forwardly and downwardly direction.

The vibrating system for the dynamic pickup includes a stylus arm 20, and the dynamic generating coil assembly 22. The stylus arm 20 supports a stylus 22 such as a sapphire or diamond at one end thereof. The stylus has a record engaging tip having a diameter of 1 mil which is the proper diameter for use with conventional long-playing micro-groove records. The opposite end of the stylus arm 20 is anchored to the coil assembly 22 so that vibrations imparted to the stylus 24 by the lateral undulations of a laterally-cut record groove will be imparted to the coil assembly 22.

The coil assembly 22 includes a cylindrical coil form 26, on which a generating coil 28 is wound. A coil having about 390 turns of No. 50 copper wire was found to give satisfactory results. The free ends of the coil 28 are connected through the conductors 30 to a pair of electrical connection terminals 32 at the rearward end of the pickup body. A baking cement 34 is used to anchor the stylus arm 20 to the coil assembly 22. This cement which may be the baking compound Ceba Araldite is suitably introduced into the coil form 26 together with one end of the stylus arm 20 and baked until the cement hardens. The Ceba Araldite material after baking is a porcelain like material and rigidly secures to coil assembly 22 and to the stylus arm 20 so that any movement of the stylus arm is transferred to the coil assembly. The stylus arm may be fastened to the coil assembly 22 in other ways, however a rigid connection which does not permit the stylus arm to flex with respect to the coil form is desired to maintain the optimum frequency response of the pickup.

The vibrating system including the coil assembly 22 and the stylus arm 20 is carried by a resilient supporting member 36. The supporting member 36 comprises a thin substantially rectangular sheet of resilient material such as "Mylar" which is a tough compliant, thermosetting plastic characterized by its ability to retain its original characteristics over a long operating life. Other materials may be used for supporting the vibrating system such as a thin sheet of aluminum, for example. The supporting members are cemented with a cold setting cement to the front surfaces 18 of the pole pieces 12 and 14, and extend across the magnetic air gap. The central portion of the supporting member 36 extending across the air gap is provided with an aperture for receiving the stylus arm 20. The stylus arm and coil assembly are cemented to a supporting member in a manner such that the coil assembly is properly disposed in the magnetic air gap, and the stylus arm extends axially therefrom in a forwardly-downwardly direction.

A stabilizing arm 38 comprises an integral portion of the supporting member 36 and extends from the lower side thereof. The stabilizing arm 38 is drawn back toward the rear portion of the pickup body in a direction substantially transverse to the plane of the supporting member 36 and secured to a relatively fixed portion of the pickup body, such as a post 40 which is mounted on the base member 10. The free end of the stabilizing arm 38 is twisted in order to pass through an axial slot cut in the end of the post 40, and is cemented thereto.

The motion of a phonograph record, which is indicated by the arrow adjacent the stylus 24 in Figure 3, tends to pull the stylus arm and attached coil forward, resulting in a type of high frequency distortion. The stabilizing arm 38 serves to stiffen the vibraitng system against motion in this forward direction while at the same time maintaining flexibility at right angles to the record groove. The stabilizing arm also serves to maintain the coil assembly in the proper position in the air gap against the effect of the pressure on the stylus when it is in engagement with a phonograph record. It can be seen that the effect of pressure on the stylus is to rock the free end of the coil assembly downwardly in the magnetic gap. This tendency is offset by the stabilizing arm which exerts a force on the supporting member 15 in a direction which is opposite to that described.

In assembling the pickup of the invention, it was found to be convenient to secure the coil assembly and stylus arm to the supporting member before cementing the supporting member 36 to the pole pieces 12 and 14. This facilitates the centering of the coil assembly in the magnetic air gap. After the coil assembly has been properly centered and the supporting member cemented to the pole pieces as described above, the stabilizing arm is secured with proper tension to the post 40.

The dynamic type phonograph pickup of the invention is adapted to be carried by the free end of a tone arm of a phonograph record player (not shown). Although the pickup described is for use with laterally-cut phonograph records, it is understood that the suspension system of the invention may be employed equally as well in vertically-cut phonograph records. As the stylus 24 engages the grooves of a phonograph record and is vibrated back and forth by the undulations thereof, this motion is transmitted by the stylus arm 20 to the coil assembly 22. The support 36 being of resilient material flexes with the movement of the stylus arm and a rocking motion of the coil 20 is obtained, the coil moving in the path of an arc cutting through the lines of force of the magnetic field in accordance with the vibration of the stylus arm 20. This motion may be considered to be substantially pivotal about the intersection of the axis of the coil assembly 22 and the plane of the supporting member 36. If desired, a corrugation can be pressed into the support 36 concentric with the coil assembly to provide for additional flexibility of the support. As the turns of the coil 28 cut the magnetic lines of force in the magnetic gap, a voltage is generated which appears at the contact terminals 32.

One of the inherent advantages of the pickup of the invention is that it has an excellent frequency response extending to 20,000 cycles per second without requiring additional viscous damping members to eliminate resonant peaks. The latter feature dispenses with the requirement for rubber or other viscous damping materials which have been proven to be undesirable in some respects. The pickup of the invention also has good sensitivity. The output voltage from the pickup can be considerably improved by replacing the cylindrical coil shown in Figures 1 to 3, with an oval-shaped coil 42 shown in Figure 4. The major axis of the oval is adapted to lie along the axis of the magnetic air gap. Thus, the two flat sides of the coil enable more of the coil to operate in close proximity to the pole pieces, and result in a gain in output.

A bottom cover plate 44 is provided to protect the vibrating system of the pickup against dust and damage to accidental contact therewith. The cover plate 44 is fastened to the base member 10 by means of a pair of small screws 46. To further protect the vibrating system from damage, the base member 10 is provided with a forward extension which projects over and above the stylus arm 20. If desired, an ornamental casing may be fitted around the pickup of the invention or the base member itself may be suitably formed to be part of an ornamental casing for the pickup.

The electrodynamic type transducer described includes a simple and inexpensive suspension system for the vibrating elements which does not require a damping material for eliminating resonant peaks. The suspension system which comprises a thin sheet of resilient material secured to the pole pieces provides the sole support for the movable coil and stylus arm, and is stiffened against movement in undesired directions by a stabilizing arm which may form an integral portion of the sheet of resilient material.

What is claimed is:

1. An electromagnetic transducer device comprising in combination, means providing a pair of magnetic pole pieces positioned in spaced relation to provide a magnetic air gap, a generating coil adapted to be positioned for movement in said magnetic air gap, a vibratile stylus arm fastened to said generating coil and extending therefrom, and resilient supporting means providing the sole support for said generating coil and said stylus arm secured to said pole pieces and extending across said magnetic air gap, the portion of said supporting means extending across said air gap having an aperture for receiving said stylus arm, said generating coil being positioned in said magnetic air gap and said stylus arm extending through said aperture to the opposite side of said supporting means.

2. An electrodynamic pickup for phonograph record players comprising in combination, means providing a pair of magnetic pole pieces positioned in spaced relation to provide a magnetic air gap, a dynamic generating coil adapted to be positioned in said magnetic air gap, a vibratile stylus arm fastened to said coil, a supporting member providing the sole support for said generating coil and said stylus arm comprising a sheet of resilient material secured to and along the edges of said pole pieces lying in the surface generally transverse to the axis of said air gap, and means securing said coil and said stylus arm to said supporting member whereby said coil is supported in said magnetic air gap and said stylus arm extends exteriorly from said air gap through an aperture in said supporting member.

3. An electromagnetic transducer device comprising in combination, a relatively stationary body member having a forward portion and a rearward portion, said body member including permanent magnet means for providing a magnetic air gap near the forward portion of said body member, vibrating means for said transducer device including a generating coil adapted to be positioned for movement in said magnetic air gap and a stylus arm fastened to said generating coil and extending therefrom, suspension means providing the sole support for said vibrating means comprising a resilient member secured near the forward portion of said body member to support said vibrating means so that said generating coil is positioned in said magnetic air gap and said stylus arm extends forwardly and downwardly from said air gap, and a stabilizing arm mechanically connected between said resilient member and said relatively stationary body member.

4. An electromagnetic transducer device comprising in combination, a relatively stationary body member having a forward portion and a rearward portion, said body member including permanent magnet means for providing a magnetic air gap near the forward portion of said body member, vibratory means for said transducer device including a generating coil adapted to be positioned for movement in said magnetic air gap and a stylus arm fastened to said generating coil and extending therefrom, means providing the sole support for said vibratory means comprising a resilient member extending across said magnetic air gap and secured near the forward portion of said base member, said vibratory means being affixed to said last-named means so that said generating coil is positioned in said magnetic air gap and said stylus arm extends generally in a downwardly direction from said air gap, and means for stabilizing said vibratory system comprising an elongated stabilizing arm connected from one side of said resilient member to a more rearward portion of said relatively stationary base member.

5. A phonograph pickup comprising a relatively stationary position including a base member and permanent magnetic means having a portion defining a magnetic air gap, a generating coil adapted to be positioned for movement in said magnetic air gap, a vibratile stylus fastened to said coil and extending axially therefrom, a supporting member providing the sole support for said generating coil and said vibratile stylus arm comprising a sheet of resilient material secured to surfaces of said portions of said permanent magnetic means and extending across said magnetic air gap, means securing said coil and stylus arm to said supporting member whereby said coil is centrally supported in said gap and said stylus extends from said gap through an aperture in said supporting member, a stabilizing member comprising an integral portion of said supporting member extending back across an edge of said air gap in a direction generally parallel to said coil axis, and means securing said stabilizing member to said relatively stationary portion.

6. A phonograph pickup comprising a relatively stationary portion including a base member having a forward portion and a back portion and a pair of magnetic pole pieces extending toward the forward portion of said pickup and positioned in spaced relation to provide a magnetic air gap, a generating coil adapted to be positioned for movement in said magnetic air gap, a vibratile stylus arm fastened to said generating coil and extending therefrom, suspension means providing the sole support for said generating coil and said vibratile stylus arm comprising a sheet of resilient material cemented to forward surfaces of said pole pieces and extending across said magnetic air gap, an aperture in said suspension means for receiving said stylus arm, said generating coil and said stylus arm being supported on said suspension means whereby said generating coil is positioned in said magnetic air gap and said stylus arm extends out of said air gap through said aperture in said suspension means, a stabilizing arm connected at the lower side of said suspension means and extending generally toward the back portion of said pickup, and means securing said stabilizing member to said relatively stationary portion.

References Cited in the file of this patent

UNITED STATES PATENTS

| | | |
|---|---|---|
| 1,900,623 | Tewksbury | Mar. 7, 1933 |
| 2,161,489 | Vieth et al. | June 6, 1939 |
| 2,247,640 | Nielsen | July 1, 1941 |
| 2,373,181 | Fleming | Apr. 10, 1945 |
| 2,509,968 | DeBoer | May 30, 1950 |
| 2,593,633 | Umpleby | Apr. 22, 1952 |

FOREIGN PATENTS

| | | |
|---|---|---|
| 330,245 | Great Britain | June 2, 1930 |